United States Patent
Wang et al.

(10) Patent No.: US 10,747,938 B2
(45) Date of Patent: *Aug. 18, 2020

(54) METHOD FOR INTEGRATED CIRCUIT MANUFACTURING

(71) Applicant: Taiwan Semiconductor Manufacturing Company, Ltd., Hsin-Chu (TW)

(72) Inventors: Hung-Chun Wang, Taichung (TW); Ching-Hsu Chang, Taipei County (TW); Chun-Hung Wu, Hsinchu (TW); Cheng Kun Tsai, Hsinchu (TW); Feng-Ju Chang, Hsinchu (TW); Feng-Lung Lin, Hsinchu County (TW); Ming-Hsuan Wu, Hsinchu County (TW); Ping-Chieh Wu, Hsinchu County (TW); Ru-Gun Liu, Hsinchu County (TW); Wen-Chun Huang, Tainan (TW); Wen-Hao Liu, Hsinchu County (TW)

(73) Assignee: TAIWAN SEMICONDUCTOR MANUFACTURING COMPANY, LTD., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/516,853

(22) Filed: Jul. 19, 2019

(65) Prior Publication Data

US 2019/0340330 A1    Nov. 7, 2019

Related U.S. Application Data

(63) Continuation of application No. 15/043,961, filed on Feb. 15, 2016, now Pat. No. 10,360,339, which is a
(Continued)

(51) Int. Cl.
G06F 17/50    (2006.01)
G06F 30/398   (2020.01)
(Continued)

(52) U.S. Cl.
CPC .............. G06F 30/398 (2020.01); G03F 1/36 (2013.01); G03F 7/70441 (2013.01);
(Continued)

(58) Field of Classification Search
None
See application file for complete search history.

(56) References Cited

U.S. PATENT DOCUMENTS 5,879,844 A    3/1999  Yamamoto
6,560,766 B2   5/2003  Pierrat et al.
(Continued)

FOREIGN PATENT DOCUMENTS

KR    20100027129    3/2010
KR    20120090728    8/2012
(Continued)

OTHER PUBLICATIONS

Pikus, F. G. et al., "Non-uniform yield optimization for integrated circuit layout", Proc. SPIE 6730, Photomask Technology 2007, 13 pages.
(Continued)

Primary Examiner — Leigh M Garbowski
(74) Attorney, Agent, or Firm — Haynes and Boone, LLP

(57) ABSTRACT

An integrated circuit (IC) manufacturing method includes receiving an IC design layout having IC regions separate from each other. Each of the IC regions includes an initial IC pattern that is substantially identical among the IC regions. The method further includes identifying a group of IC regions from the IC regions. All IC regions in the group have a substantially same location effect, which is introduced by
(Continued)

global locations of the IC regions on the IC design layout. The method further includes performing a correction process to a first IC region in the group, modifying the initial IC pattern in the first IC region into a first corrected IC pattern. The correction process includes using a computer program to correct location effect. The method further includes replacing the initial IC pattern in a second IC region in the group with the first corrected IC pattern.

20 Claims, 7 Drawing Sheets

Related U.S. Application Data continuation of application No. 14/293,050, filed on Jun. 2, 2014, now Pat. No. 9,262,578.

(60) Provisional application No. 61/984,572, filed on Apr. 25, 2014.

(51) Int. Cl.
*G03F 7/20* (2006.01)
*G03F 1/36* (2012.01)
H01L 27/02 (2006.01)
G06F 30/39 (2020.01)
G06F 119/18 (2020.01)

(52) U.S. Cl.
CPC .......... *G06F 30/39* (2020.01); *G06F 2119/18* (2020.01); *H01L 27/0207* (2013.01)

(56) References Cited

U.S. PATENT DOCUMENTS

| | | | |
|---|---|---|---|
| 6,563,566 B2* | 5/2003 | Rosenbluth | G03F 1/32 250/492.2 |
| 6,795,955 B2 | 9/2004 | MacLean et al. | |
| 6,807,663 B2 | 10/2004 | Cote et al. | |
| 6,808,850 B2 | 10/2004 | Pierrat | |
| 6,845,497 B2 | 1/2005 | Murai | |
| 6,898,780 B2 | 5/2005 | Egorov et al. | |
| 7,000,208 B2 | 2/2006 | Zhang | |
| 7,093,228 B2 | 8/2006 | Andreev et al. | |
| 7,266,800 B2 | 9/2007 | Sezginer | |
| 7,305,651 B2* | 12/2007 | Cao | G03F 1/36 716/52 |
| 7,399,648 B2 | 7/2008 | Bzowy | |
| 7,451,068 B2 | 11/2008 | Melvin, III | |
| 7,495,243 B2* | 2/2009 | Kamikubo | B82Y 10/00 250/306 |
| 7,496,884 B2 | 2/2009 | Fang et al. | |
| 7,511,290 B2* | 3/2009 | Suzuki | B82Y 10/00 250/492.22 |
| 7,608,845 B2* | 10/2009 | Abe | B82Y 10/00 250/306 |
| 7,662,522 B2 | 2/2010 | Abe | |
| 7,765,515 B2 | 7/2010 | Ying | |
| 7,908,579 B2 | 3/2011 | Irmatov et al. | |
| 7,926,002 B2 | 4/2011 | Word et al. | |
| 7,987,084 B2 | 7/2011 | MacLean et al. | |
| 8,319,962 B2* | 11/2012 | Tu | G03F 1/84 356/237.5 |
| 8,352,889 B2* | 1/2013 | Emi | H01J 37/3174 716/53 |
| 8,381,153 B2 | 2/2013 | Chiang et al. | |
| 8,392,854 B2 | 3/2013 | Kim et al. | |
| 8,527,916 B1 | 9/2013 | Chiang et al. | |
| 8,555,209 B2 | 10/2013 | Chung | |
| 8,572,520 B2 | 10/2013 | Chou et al. | |
| 8,589,828 B2 | 11/2013 | Lee et al. | |
| 8,589,830 B2 | 11/2013 | Chang et al. | |
| 8,627,241 B2 | 1/2014 | Wang et al. | |
| 8,631,360 B2 | 1/2014 | Wang et al. | |
| 8,631,361 B2 | 1/2014 | Feng | |
| 8,732,626 B2 | 5/2014 | Liu et al. | |
| 8,739,075 B2 | 5/2014 | Saito et al. | |
| 8,739,080 B1 | 5/2014 | Tsai et al. | |
| 8,745,550 B2 | 6/2014 | Cheng et al. | |
| 8,751,976 B2 | 6/2014 | Tsai et al. | |
| 8,762,900 B2 | 6/2014 | Shin et al. | |
| 8,812,998 B2 | 8/2014 | Tao | |
| 8,812,999 B2 | 8/2014 | Liu et al. | |
| 8,850,366 B2 | 9/2014 | Liu et al. | |
| 8,898,606 B1 | 11/2014 | Abou Ghaida et al. | |
| 8,975,195 B2* | 3/2015 | Lukanc | G03F 1/70 438/780 |
| 9,262,578 B2 | 2/2016 | Wang et al. | |
| 9,390,490 B2 | 7/2016 | Takagi et al. | |
| 10,061,192 B2* | 8/2018 | Beyer | G03F 7/70625 |
| 10,234,756 B2* | 3/2019 | Tyminski | G06F 30/398 |
| 10,381,194 B2* | 8/2019 | Kato | H01J 37/3174 |
| 2002/0108098 A1 | 8/2002 | Igeta | |
| 2006/0068301 A1 | 3/2006 | Hirukawa | |
| 2007/0074142 A1 | 3/2007 | Smayling | |
| 2009/0032739 A1* | 2/2009 | Kawase | B82Y 10/00 250/492.23 |
| 2010/0064274 A1 | 3/2010 | Grimm | |
| 2010/0233598 A1* | 9/2010 | Matsunawa | G03F 1/36 430/30 |
| 2013/0267047 A1 | 10/2013 | Shih et al. | |
| 2014/0101624 A1 | 4/2014 | Wu et al. | |
| 2014/0109026 A1 | 4/2014 | Wang et al. | |
| 2014/0120459 A1 | 5/2014 | Liu et al. | |
| 2014/0282334 A1 | 9/2014 | Hu et al. | |
| 2016/0162627 A1 | 6/2016 | Wang et al. | |

FOREIGN PATENT DOCUMENTS

| | | |
|---|---|---|
| KR | 20120090810 | 8/2012 |
| KR | 20120098754 | 9/2012 |
| TW | I1234195 | 6/2005 |
| TW | 200725348 | 7/2007 |

OTHER PUBLICATIONS

Huang H.-T. et al., "Model calibration and slit position effect on full-mask process and proximity correction for extreme ultraviolet lithography", Proc. SPIE 8322, Extreme Ultraviolet (EUV) Lithography III, Mar. 23, 2012, 9 pages.

Wang, Y. et al., "Analysis, quantification, and migration of electrical variability due to layout dependent effects in SOC designs", Proc. of SPIE 8327, Design for Manufacturability through Design-Process Integration VI, 2012, 14 pages.

Yang, S.-H. et al., "Proximity effect correction optimization considering fogging and loading effects compensation", Proc. of SPIE 4689, Metrology, Inspection, and Process Control for Microlithography XVI, 2002, pp. 977-984.

Translated Notice of Allowance of Patent dated Nov. 9, 2016, Application No. KR10-2015-0058213, 5 pages.

* cited by examiner

METHOD FOR INTEGRATED CIRCUIT MANUFACTURING

PRIORITY

This is a continuation of U.S. application Ser. No. 15/043,961, entitled "Method for Integrated Circuit Manufacturing," filed Feb. 15, 2016, which is a continuation of U.S. application Ser. No. 14/293,050, filed Jun. 2, 2014, now issued U.S. Pat. No. 9,262,578, which claims the benefit of U.S. Prov. No. 61/984,572, filed Apr. 25, 2014. The entire disclosure of the above applications is herein incorporated by reference.

BACKGROUND

The integrated circuit (IC) design and manufacturing is more challenging when semiconductor technologies are continually progressing to smaller feature sizes, such as 45 nanometers (nm), 28 nm, and below. For example, photolithography is used for transferring design patterns to wafers. Imaging inaccuracy of photolithography at smaller process nodes has resulted in unsatisfactory pattern transfer. For example, rounded corners on a device feature that is designed to have right-angle corners may become more pronounced or more critical in the smaller nodes, preventing the device from performing as desired. Other examples of inaccurate or poorly shaped device features include pinching, necking, bridging, dishing, erosion, metal line thickness variations, and other characteristics that affect device performance.

Typically, optical proximity correction (OPC) may be performed on a design pattern to help alleviate some of these difficulties before the design pattern is used in later operations in an IC manufacturing process, such as an operation creating a mask or a photolithography process exposing wafers. OPC may modify shapes of the design pattern and/or insert assist features (AF) based on simulated IC manufacturing processes.

However, along with the progress of the lithography patterning, some other imaging effects are unavoidable and those imaging effects are related to the location of the patterns on a mask or an imaging tool. For 28 nm process nodes and below, the severity of main feature distortion caused by those location effects has become unacceptable in terms of device performance, quality and reliability. Therefore, it is desirable to correct patterns to address those imaging effects effectively and efficiently.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
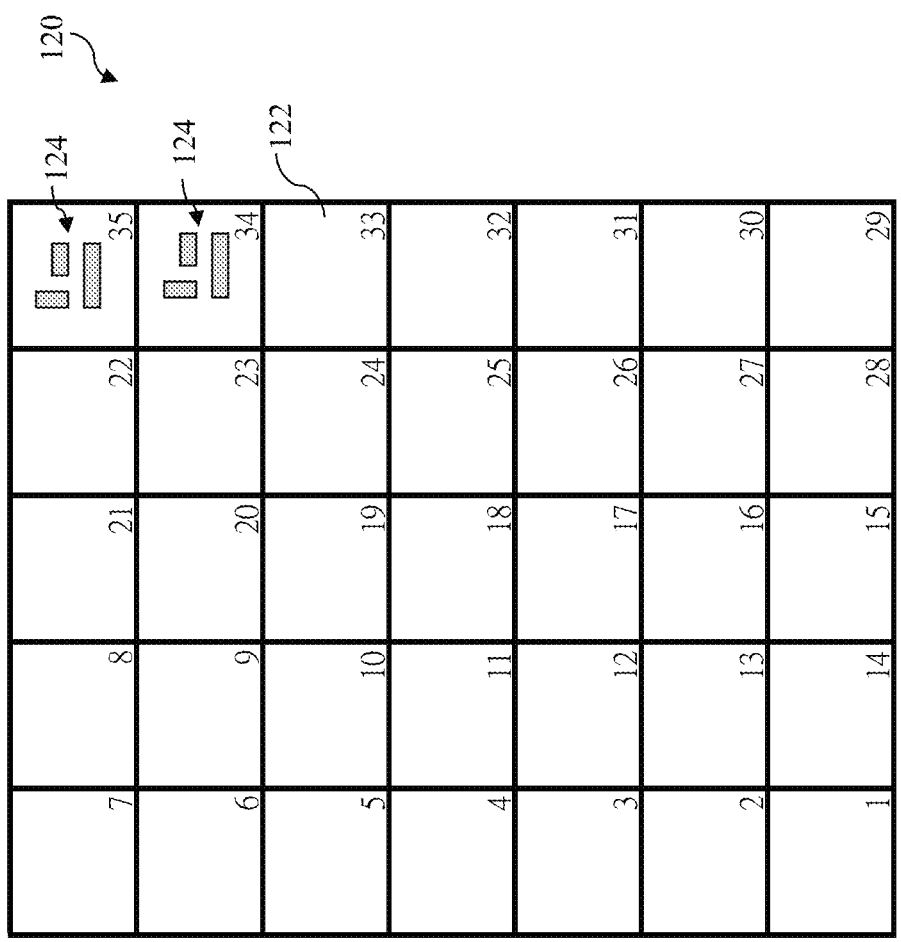
FIG. 1 is a schematic view of an IC design layout constructed according to aspects of the present disclosure in an embodiment.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a schematic view of an exemplary IC design layout 120 constructed for the purpose of illustrating the inventive concept of the present disclosure. The IC design layout 120 is defined with a plurality of IC regions 122, labeled as 1, 2, 3, . . . , (i+1), . . . , and N, respectively. In the present example, the IC design layout 120 includes 35 IC regions 122. For purposes of simplicity, the i-th IC region 122 is referred to as IC region 122-i in the following discussion. Furthermore, each of the IC regions 122 includes an identical initial IC pattern 124, as illustrated in IC regions 122-34 and 122-35. The IC pattern 124 includes one or more main features corresponding to patterns of metal, oxide, or semiconductor layers that make up the various components of the IC device to be fabricated, such as an active region, gate electrode, source and drain, metal lines or vias of an interlayer interconnection, and openings for bonding pads. In one example, each IC region 122 defines an IC die that includes the IC pattern 124 therein.

When the IC design layout 120 is transferred to a mask or a wafer for manufacturing the final IC devices, various imaging effects may occur. These imaging effects may cause the fabricated IC pattern 124 in various IC regions 122 to differ in the final IC devices even though the initial IC pattern 124 are the same. These effects include proximity effect and location effect.

The proximity effect refers to an imaging effect during a lithography process wherein an imaging variation is introduced by approximate features due to light diffraction and interference. For example, a pattern feature in an environment with a dense pattern and an identical feature in an isolated environment would result in images with different critical dimensions. The IC design layout can be tuned to account for the proximity effect by resizing, reshaping, adding assist features, adding scattering bars, or combinations thereof so as to improve the image by the lithography process. This method is referred to as optical proximity correction (OPC).

The location effect refers to the imaging effect during a lithography process wherein an imaging variation is introduced by and is associated with the location of the respective pattern feature in the IC design layout. For example, when the lithography process uses an extreme ultraviolet (EUV) beam, the EUV beam is tilted to the optical axis of the lithography system, such as with a tilt angle of about 6 degree. A shadow effect is introduced by the tilt illumination and causes an image distortion that is dependent on the location of the pattern feature to be imaged. In various embodiments where lithography process uses EUV lithography, the location effect includes shadow effect, flare effect, border effect, resist heating effect, baking effect, developing loading effect, etching loading effect, or combinations thereof. In various embodiments where the lithography process uses electron beam (or e-beam) direct write (EBDW), the location effect includes fogging effect, hotplate effect, flare effect, resist heating effect, baking effect, developing loading effect, etching loading effect, or combinations thereof. The location effect can be reduced by tuning the IC design layout, including resizing, reshaping, adding assist features, adding scattering bars or combinations. This method is referred to as location effect correction (LEC).

In different perspective, the proximity effect is related to a local environment on the IC design layout while the location effect is related to a global location on the IC design layout. Particularly, the location of the pattern feature in the IC design layout is a factor to be considered during LEC.

Figure 2:
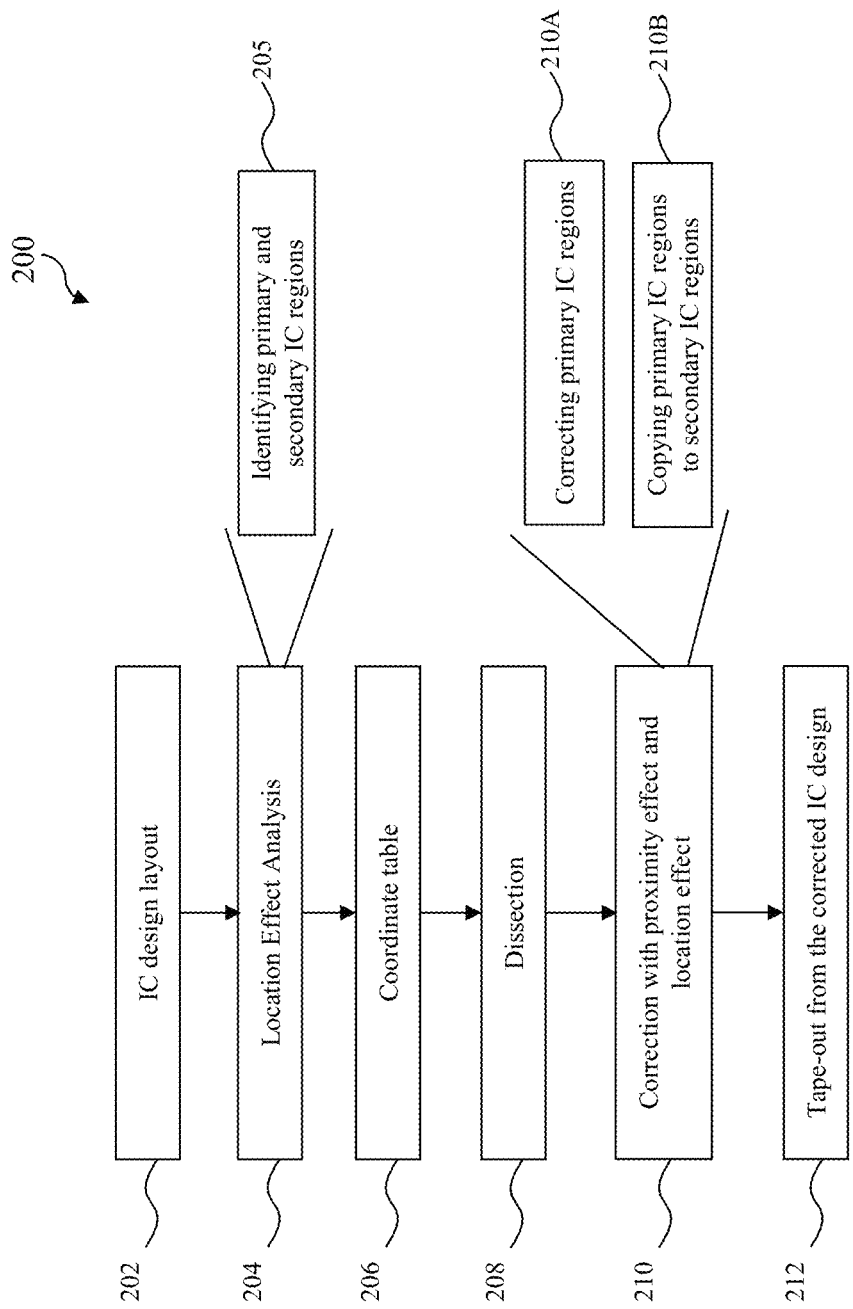
FIG. 2 is a flow chart of an IC manufacturing method, in accordance with an embodiment.

FIG. 2 is a flow chart of an IC manufacturing method 200 according to various aspects of the present disclosure. The method 200 provides an IC design approach to collectively consider both proximity effect and location effect, and efficiently tune/modify the IC design layout accordingly for improved imaging during a lithography process. The method 200 is an example, and is not intended to limit the present disclosure beyond what is explicitly recited in the claims. Additional operations can be provided before, during, and after the method 200, and some operations described can be replaced, eliminated, or moved around for additional embodiments of the method. The method 200 is described below with the IC design layout 120 as an example.

The method 200 receives the IC design layout 120 at operation 202. In an example, the IC design layout 120 is received from a designer, or a design house in some embodiment. In various embodiments, the designer is a design team separated from a semiconductor manufacturer assigned for making IC devices according to the IC design layout 120. The semiconductor manufacturer is capable for making masks (or photomasks or reticles), semiconductor wafers, or both. The IC design layout 120 includes various geometrical patterns designed for an IC device. The IC design layout 120 may also include certain assist features, such as those features for processing enhancement, and/or mask identification information. The designer implements a proper design procedure to form the IC design layout 120. The design procedure may include logic design, physical design, and/or place and route. The IC design layout 120 is presented in one or more data files having information of the geometrical patterns. For example, the IC design layout 120 can be expressed in a GDSII file format, OASIS file format or DFII file format.

The method 200 (FIG. 2) proceeds to operation 204 to analyze location effect upon the various IC regions 122, and to divide the IC regions 122 into groups based on the location effect analysis. A goal of this analysis is to simplify downstream pattern correction operation thereby improving IC manufacturing efficiency. The location effect information may be provided by the semiconductor manufacturer based on, e.g., lithography tools and processes to be used.

Figure 3:
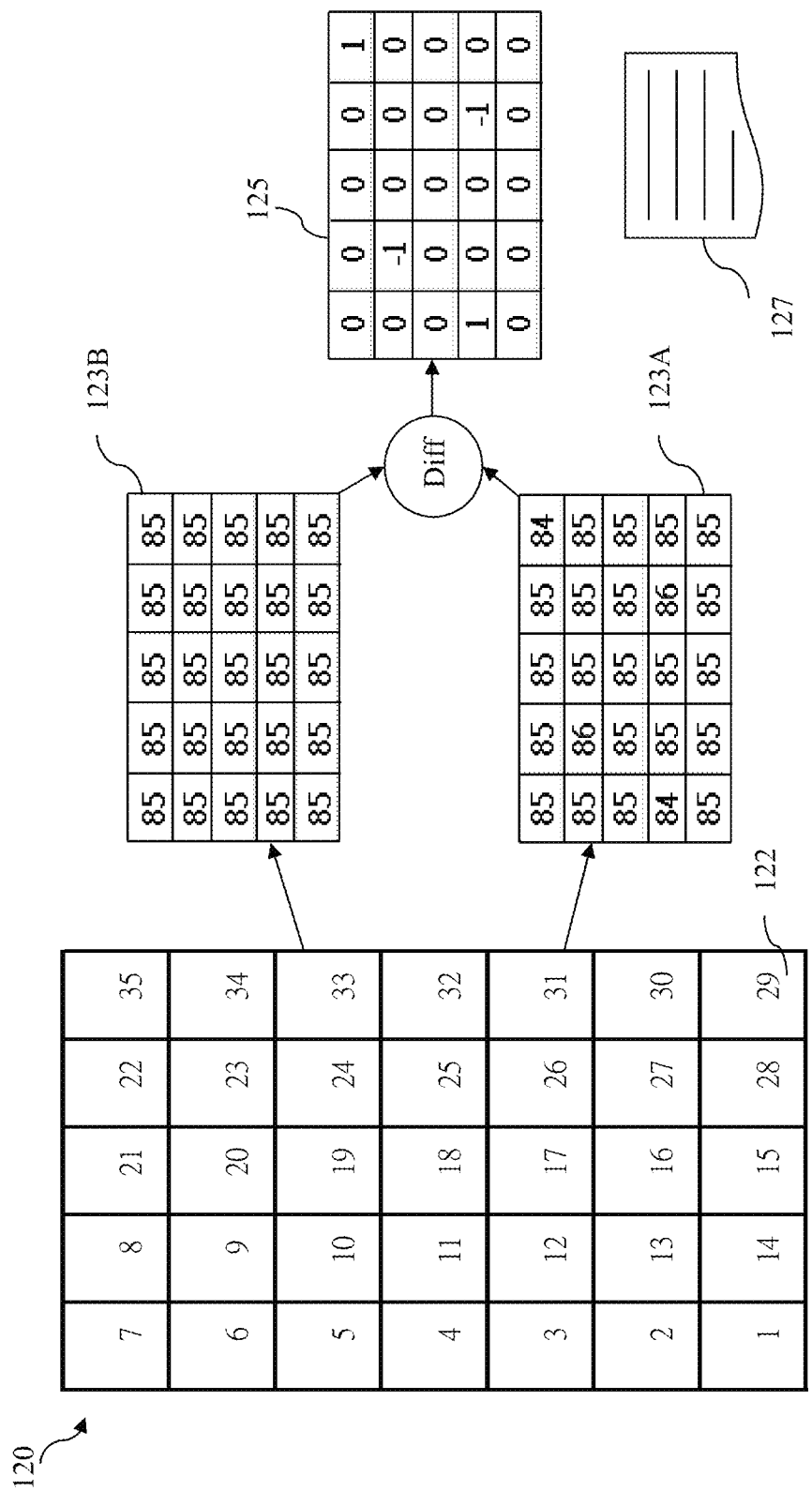
FIGS. 3, 4, and 5 illustrate embodiments of location effect analysis to the IC design layout in FIG. 1.

One example of location effect information is provided in FIG. 3. Referring to FIG. 3, location effect upon the IC regions 122-31 and 122-33 are presented as grey level pixels in two tables 123A and 123B respectively. In an embodiment, the tables 123A and 123B represent EUV flare maps or portions thereof. Furthermore, as illustrated in FIG. 3, although the IC regions 122-31 and 122-32 have identical IC design patterns therein, they will be subject to different imaging effect due to difference in their location on the IC design layout 120. The difference in imaging effect is shown in table 125, where a "0" value indicates the corresponding pixels in the IC regions 122-31 and 122-32 will be subject to the same imaging effect, and a non-zero value (e.g., "1" and "−1") indicates otherwise.

FIG. 3 further illustrates some criteria 127 to be considered by the method 200, particularly, by operation 204. The criteria 127 define how much imaging effect difference is acceptable to the final IC device. The criteria 127 can be flexibly designed, e.g., based on the specification of the IC device. In an embodiment, the criteria 127 include one threshold setting that is applicable to all pixels in one IC region 122. In another embodiment, the criteria 127 include one threshold setting per pixel for every pixel in one IC region 122. In yet another embodiment, the criteria 127 include one threshold setting for a portion of the pixels and another threshold setting for another portion of the pixels. For example, some portions of the IC region 122 are used for testing or process monitoring purposes, and are less critical than some other portions of the IC region 122. Therefore, these less critical portions can be accorded a less stringent imaging error tolerance than the other portions. For illustrative purposes, the criteria 127 of the present example use a single threshold setting, such as to the effect that "if the maximum location effect difference between corresponding pixels is within 2, then, the two IC regions are considered to have substantially the same location effect." In the present example, the IC regions 122-31 and 122-33 are considered to have substantially the same location effect under the criteria 127 because location effect difference between corresponding pixels of the two IC regions is "0," "1," or "4," which is within the threshold of "2."

Figure 4:
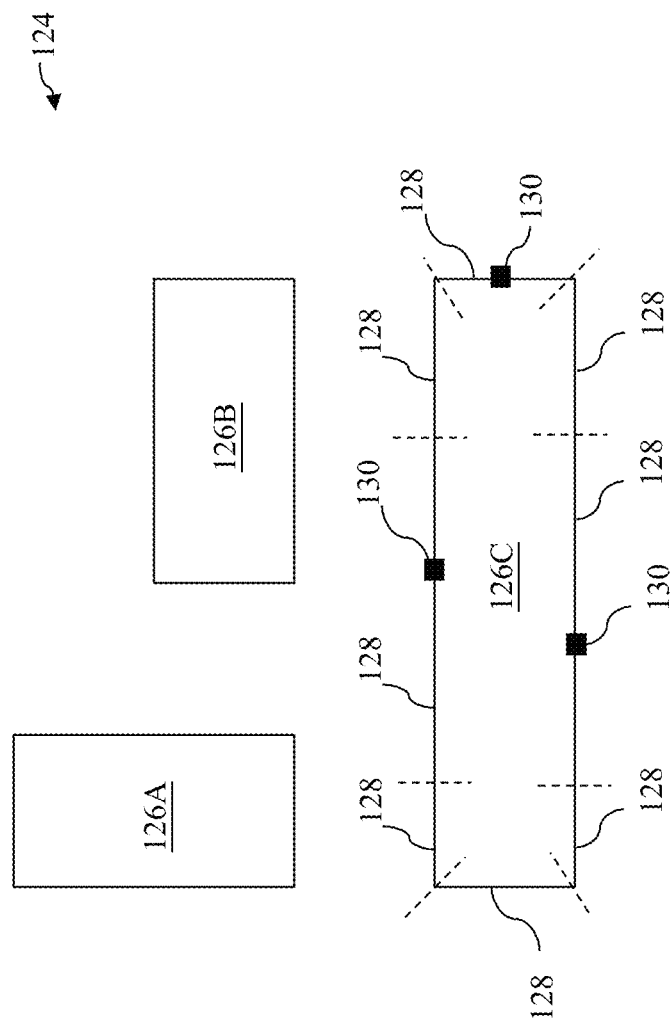

In various embodiments, the location effect information presented in the tables 123A and 123B may include one or more location effects, such as fogging effect of EBDW, flare effects of EUV, other types of location effects, or a combination thereof. Furthermore, the tables 123A and 123B may represent location effect information at a certain level of resolution in various embodiments, including at pixel level as discussed above. For example, instead of comparing location effect between the IC regions 122-31 and 122-33 at pixel level, operation 204 may compare points of interest between the two IC regions at another level of resolution, such as target points, segments, polygons, patterns, or areas. To further illustrate this point, referring to FIG. 4, shown therein is the IC design pattern 124 (FIG. 1) that includes three polygons (or main features) 126A, 126B, and 126C. In an embodiment, operation 204 compares the location effect between two IC regions at polygon level, such as comparing location effect of the two IC regions at the geometric center of each of the polygons 126A, 126B, and 126C. FIG. 4 further illustrates that the polygon 126C is divided into multiple segments 128 which jointly represent the polygon 126C. In an embodiment, operation 204 compares the location effect between two IC regions at segment level. For example, it compares location effect of the two IC regions at the geometric center of each of the segments 128, as well as segments of the polygons 126A and 126B, though not shown. FIG. 4 further illustrates that various target points 130 are assigned to the polygon 126C for simulation verification or other design purposes. The target points 130 are virtual points and represent spatial locations relative to the polygon 126C. For example, the target points 130 can be used as reference to verify that the polygon 126A is properly imaged such that the imaged main features hit or close to the target points. In an embodiment, operation 204 compares the location effect between two IC regions at target point level. For example, it compares location effect of the two IC regions at the assigned target points 130, as well as target points assigned to the polygons 126A and 126B, though not shown. In other embodiments, operation 204 may compare location effect between two IC regions at pattern level that includes multiple polygons, or at area level that includes multiple patterns.

Referring back to FIG. 2, operation 204 includes operation 205 of identifying primary IC regions and secondary IC regions, wherein each of the secondary IC regions is associated with one of the primary IC regions and the two associated IC regions have substantially the same location effect under the criteria 127 (FIG. 3). In various embodiments, two primary IC regions may have the same, similar, or different location effects. A goal of operation 205 is that, by such identification, only a subset of the IC regions (the primary IC regions) will undergo location effect correction process in a later operation, while all other IC regions (the secondary IC regions) will copy the correction results from their associated primary IC region, greatly reducing design turn-around time.

Figure 5:
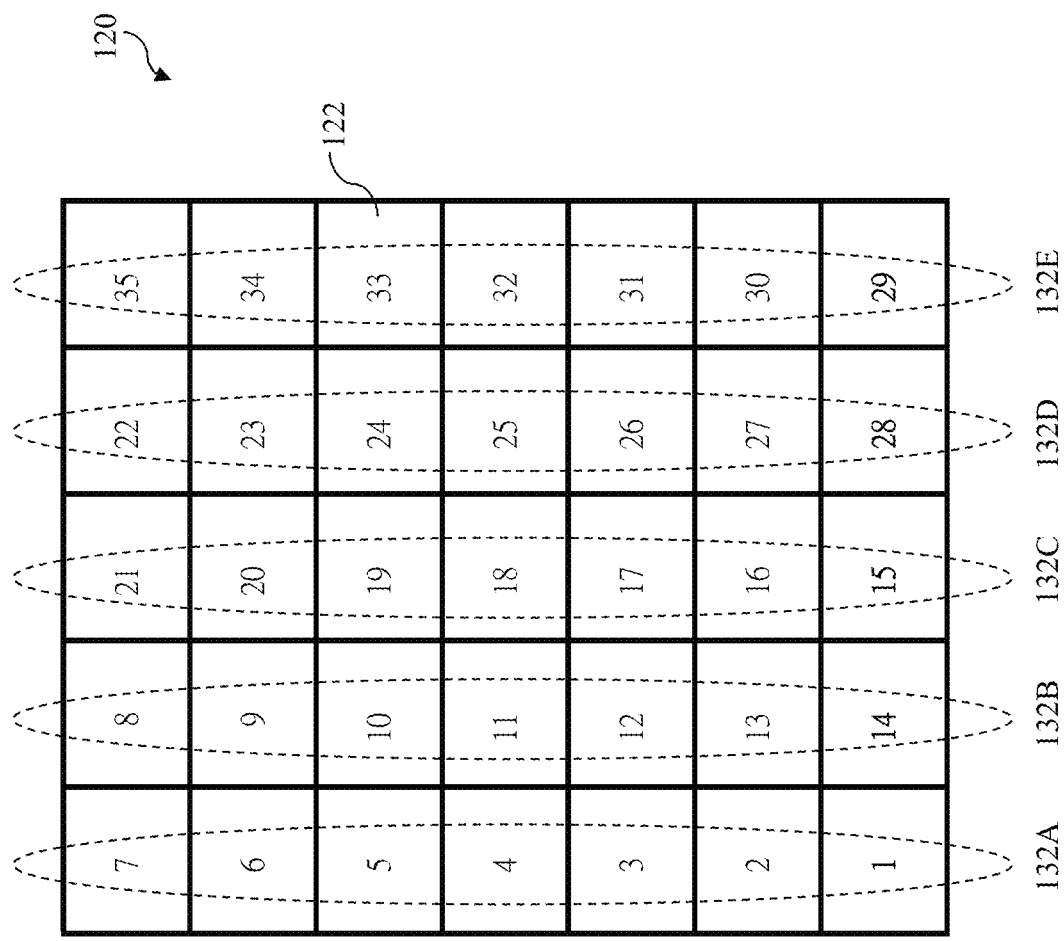

Referring to FIG. 5, after location effect analysis, five (5) groups, 132A-E, have been identified. Group 132A includes IC regions 122-1 through 122-7, group 132B includes IC regions 122-8 through 122-14, group 132C includes IC regions 122-15 through 122-21, group 132D includes IC regions 122-22 through 122-28, and group 132E includes IC regions 122-29 through 122-35. IC regions within a group have substantially the same location effect under the criteria 127 (FIG. 3). For example, IC regions 122-2 through 122-7 have substantially the same location effect as IC region 122-1. Within each of the five groups, operation 205 further designates one IC region as a primary IC region and other IC regions as secondary IC regions associated with this primary IC region. For example, in group 132A, IC region 122-1 is designated as primary IC region and IC regions 122-2 through 122-7 as secondary IC regions associated with IC region 122-1. Similarly, IC regions 122-14, 122-15, 122-28, and 122-29 are designated as primary IC regions and other IC regions are designated as secondary IC regions in groups 132B, 132C, 132D, and 132E respectively. In various embodiments, members in an IC region group may be located in the same or different rows, the same or different columns, or anywhere in the design layout 120. In some embodiments, a group may include only one IC region—a primary IC region without any associated secondary IC regions. However, in a typical case, a group includes more than one IC region. Various methods can be used to divide the IC regions 122 into groups such as the groups 132A through 132E. In an embodiment, IC region 122-1 is chosen as a base and all other IC regions are compared against it using one or more methods discussed with respect to FIG. 3. The IC regions found to have substantially the same location effect as IC region 122-1 are grouped with IC region 122-1. Then, for IC regions yet to be grouped, another IC region is chosen as a base, and the above comparison and grouping repeat until all IC regions are grouped.

In some embodiments, the method 200 (FIG. 2) proceeds to operation 206 to provide a coordinate table associated with the IC design layout 120. The coordinate table includes the coordinates of each of the IC regions 122 in the IC design layout 120. With the IC pattern 124 and the coordinates of each IC region, the IC design layout 120 is well defined since the location of each IC region is given by the respective coordinates and the pattern in the IC region is the IC pattern 124. In one example, the coordinates of an IC region include two numbers X and Y, representing its location relative to the IC region 122-1.

Figure 6:
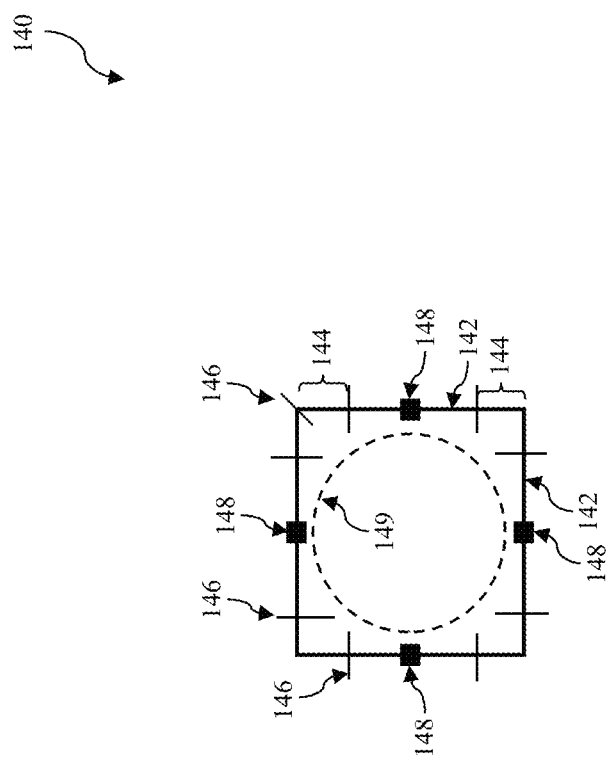
FIG. 6 illustrates an embodiment of a main feature of the IC design layout of FIG. 1.

In some embodiments, the method 200 proceeds to operation 208 by performing a dissection process to the IC design layout 120. In one example, the dissection process is applied to each of the main feature polygons in the primary IC regions. The dissection process includes dissecting edges of a main feature into a plurality of segments such that each segment can be independently adjusted during the subsequent steps for OPC and LEC. More segments dissected from a main feature, more freedom to tune the pattern of the main feature but more time cost as well. To illustrate this point, referring to FIG. 6, shown therein is a main feature 140 being dissected into multiple segments 144 defined by dissection points 146. Various target points 148 are further assigned to the main feature 140 for simulation verification or other design purposes. For example, when a simulated contour 149 of the main feature 140 is generated in a later step by simulation, the target points 148 are checked to verify if the targets hit or are close to the simulated contour 149. The contour 149 is a simulated image of the main feature 140 when the main feature 140 is transferred to a product substrate, such as a semiconductor wafer by a lithography process.

In some embodiments, the method 200 performs a retargeting process to the primary IC regions after the dissection operation 208. A typical retargeting process is a rule-based approach that modifies the IC design layout according to various retargeting rules so as to improve the imaging when the IC design layout is transferred to a wafer. In various examples, the retargeting process includes repositioning, resizing, reshaping, adding assist features, adding scattering features, or combinations thereof. In another example, the retargeting process is applied to the main feature 140 (FIG. 6) such that a subset of the segments of the main feature 140 are adjusted, respectively, according to the retargeting rules. The adjustment to a main feature includes moving/relocating the dissected edge segments such that the main feature is reshaped. In an embodiment, the retargeting rules include OPC rules used to tune the IC design layout for reducing proximity effect. In another embodiment, the retargeting rules include location effect correction (LEC) rules used to tune the IC design layout for reducing location effect. The location of the pattern feature is a factor to be considered during the LEC retargeting process. In another embodiment, the retargeting rules include design rules, given by the semiconductor manufacturer in consideration of the manufacturing capability. In yet another embodiment, the retargeting rules include a combination or a subset of the OPC rules, LEC rules and design rules.

The method 200 (FIG. 2) proceeds to operation 210 to perform a correction process to the IC design layout 120. In the present embodiment, the correction process corrects (operation 210A) the IC patterns in the primary IC regions for location effect and proximity effect, and copies (operation 210B) the corrected IC patterns from each of the primary IC regions to the secondary IC regions that are associated with the respective primary IC region. As far as proximity effect is concerned, since the primary and secondary IC regions have the same initial IC pattern 124, the proximity effect correction is the same for both the primary and secondary IC regions. As far as location effect is concerned, since a secondary IC region has substantially the same location effect as an associated primary IC region, the location effect correction is the same for both the primary and secondary IC regions. Therefore, operation 210 is not only justified, but also desirable because it greatly reduces design tool processing time compared with design approaches that correct each IC region separately. For example, with respect to the design layout 120 as shown in FIG. 5, only five IC regions will undergo the correction process, which represents 85% reduction in the processing time.

In the present embodiment, operation 210 performs a model based correction process that uses a simulation model, referred to as correction model, to tune IC design layout 120. The correction process and the correction model include the location effect. In an embodiment, the correction process and the correction model also includes proximity effect so that both location effect and proximity effect are corrected in one process. In the present embodiment, the correction process is applied to each primary IC regions 122 of the IC design layout 120.

In an embodiment, when the correction process is applied to an IC region, the IC pattern in the IC region is adjusted by various measures that include repositioning, resizing, reshaping, adding assist features, adding scattering features, or combinations thereof. Such adjustment is made according to the location effect and respective set of coordinates of the IC region. Then the correction model is applied to the adjusted IC pattern in the IC region to generate a simulated contour. The simulated contour reflects the impact of the location effect and/or proximity effect to the adjusted IC pattern. The contour is evaluated to check if the contour satisfies the targets (or target points), which means that the contour hits the targets or is close to the targets within a predefined range. If the targets are not satisfied by the contour, another adjustment is applied to the adjusted IC pattern in the IC region. Then another simulation using the correction model is applied to the newly adjusted IC pattern, generating another contour. The generated contour is further checked to see if the targets are satisfied. This correction process is iterated until the assigned targets are satisfied. The final adjusted IC pattern is referred to as the corrected IC pattern 124. Similarly, the final adjusted IC design layout by the correction process is referred to as the corrected IC design layout 120.

The method 200 (FIG. 2) proceeds to operation 212 to tape-out the corrected IC design layout 120 in a format suitable for further semiconductor fabrication processes, such as mask fabrication or wafer fabrication. In an embodiment, the method 200 performs a mask rule check (MRC) to the corrected IC design layout 120 prior to taping out data for mask fabrication. MRC checks the corrected IC design layout 120 with a set of mask creation rules which may contain certain geometric and connectivity restrictions to ensure sufficient margins and to account for variability in semiconductor manufacturing processes. MRC may modify the corrected IC design layout 120 to compensate for limitations during mask fabrication. In another embodiment where maskless lithography, such as EBDW or ion beam lithography, is used, no mask is fabricated. The corrected IC design layout 120 may be directly used in such maskless lithography for wafer fabrication. In this case, some other rules may be extracted from, e.g., the e-beam direct writing, referred to as EBDW rules. Instead of performing the mask rule check, the corrected IC design layout 120 is checked according to the EBDW rules and may be modified according to the EBDW rules such that the EBDW can be properly implemented according to the modified IC design layout.

In various embodiments, the method 200 may include further process steps in the IC fabrication. For example, the method 200 may proceed to fabricating a mask or a group of masks based on the tape-out of the modified IC design layout 120. In an embodiment, an e-beam or multiple e-beams is used to form a pattern on a mask (photomask or reticle) based on the tape-out. The mask can be of different types, such as a transmissive mask or a reflective mask, and can be formed in various technologies, such as binary mask or phase shift mask (PSM). In one example, a binary mask includes a transparent substrate (e.g., fused quartz), and an opaque material (e.g., chromium) coated in the opaque regions of the mask. In another example, a PSM includes various features configured to have proper phase difference to enhance the resolution and imaging quality. In various examples, the PSM can be an attenuated PSM or an alternating PSM known in the art.

In an embodiment, the method 200 may proceed to fabricating semiconductor wafers using a mask or a set of masks formed by the above method. A semiconductor wafer includes a silicon substrate or other proper substrate and material layers formed thereon. In this case, EUV lithography may be used to fabricate semiconductor wafers using the mask(s). In another embodiment, the tape-out of the IC design layout 120 is directly used to pattern a semiconductor wafer by an EBDW lithography apparatus. In either situation (EUV or EBDW), since both the proximity effect and the location effect are considered in the correction process, the imaging quality is substantially improved.

Figure 7:
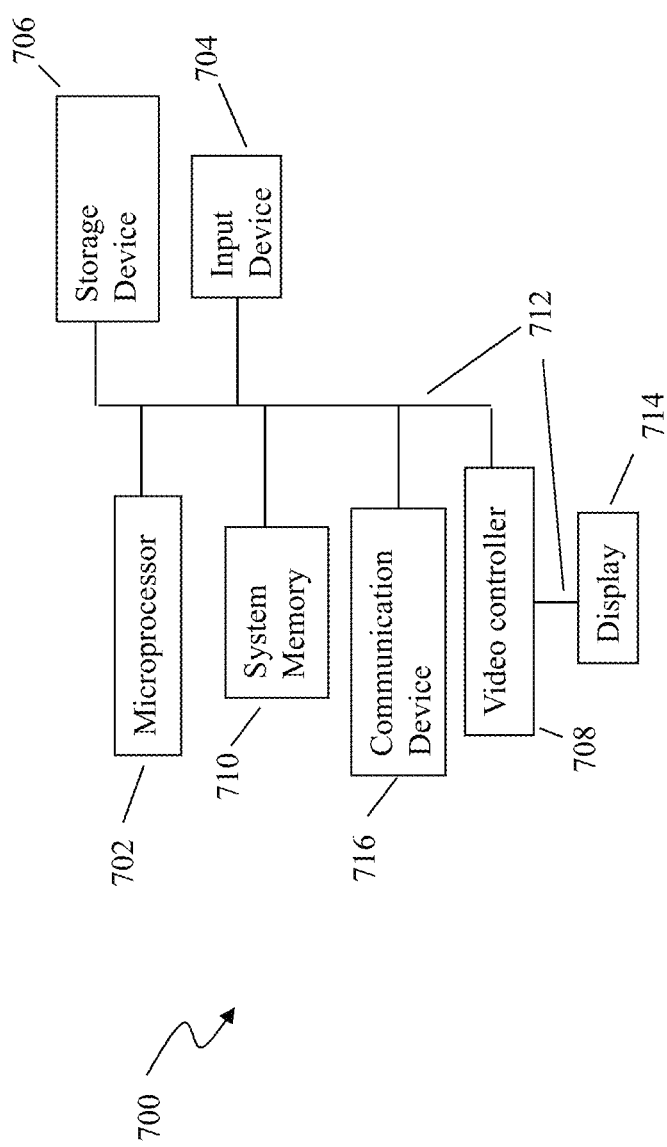
FIG. 7 is an illustration of a computer system for implementing one or more embodiments of the present disclosure.

Referring now to FIG. 7, shown therein is an illustrative computer system 700 for implementing embodiments of the method 200 described above. One example of using the computer system 700 is to perform location effect analysis and to group various IC regions accordingly. Due to many possibilities of grouping and different levels of resolution, a computer-aided automation program can be implemented to optimize the primary/secondary IC region identification. Another example of using the computer system 700 is to simulate an OPC or LEC processing to generate simulated contours and iteratively correct IC design patterns for proximity effect and/or location effect. Yet another example of using the computer system 700 is to store the design layout 120 in one or more computer-readable medium for transferring the design layout 120 from one process stage (or tool) to another process stage (or tool). Computer system 700 includes a microprocessor 702, an input device 704, a storage device 706, a video controller 708, a system memory 710, a display 714, and a communication device 716 all interconnected by one or more buses 712. The storage device 706 could be a floppy drive, hard drive, CD-ROM, optical drive, flash drive, or any other form of storage device. The storage device 706 may be capable of receiving a floppy disk, CD-ROM, DVD-ROM, flash drive, or any other form of computer-readable medium that may contain computer-executable instructions. The communication device 716 could be a modem, network card, or any other device to enable the computer system to communicate with other nodes. In addition, any computer system could represent a plurality of interconnected (whether by intranet or Internet) computer systems, including without limitation, personal computers, mainframes, PDAs, and cell phones.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the present disclosure. One example is to directly manufacture software functions into a silicon chip. Accordingly, combinations of hardware and software are also included within the definition of a computer system and are thus envisioned by the present disclosure as possible equivalent structures and equivalent methods.

Computer-readable mediums include passive data storage, such as a random access memory (RAM) as well as semi-permanent data storage such as a compact disk read only memory (CD-ROM). In addition, an embodiment of the present disclosure may be embodied in the RAM of a computer to transform a standard computer into a new specific computing machine.

The system may be designed to work on any specific architecture. For example, the system may be executed on a single computer, local area networks, client-server networks, wide area networks, internets, hand-held and other portable and wireless devices and networks.

Although not intended to be limiting, one or more embodiments of the present disclosure provide many benefits for IC design and manufacturing. For example, by conducting location effect analysis to a design layout and grouping IC regions therein accordingly, some embodiments of the present disclosure greatly reduce the number of IC regions undergoing OPC/LEC process, which usually takes considerable computer resources. Some embodiments of the present disclosure reduce design turn-around time because the pattern correction process is sped up. Another benefit of the present disclosure is that data management overhead at the design house (as well as mask house and IC manufacturer) is reduced due to less design layout data to store and transfer. Furthermore, some embodiments of the present disclosure collectively consider both proximity effect and location effect, and efficiently tune/modify the IC design layout for improved imaging during a lithography process.

In one exemplary aspect, the present disclosure is directed to an integrated circuit (IC) manufacturing method. The method includes receiving a design layout of an IC, wherein the design layout includes a plurality of non-overlapping IC regions and each of the IC regions includes a same initial IC pattern. The method further includes dividing the IC regions into a plurality of groups based on a location effect analysis to the IC design layout such that all IC regions in a respective one of the groups have substantially same location effect. The method further includes performing a correction process to the IC design layout using a correction model that includes location effect thereby resulting in a corrected IC design layout. The correction process includes performing a first correction to a first IC region in one of the groups, thereby modifying the initial IC pattern in the first IC region to result in a first corrected IC pattern in the first IC region; copying the first corrected IC pattern to other IC regions in the respective one of the groups, thereby replacing the initial IC pattern in the other IC regions with the first corrected IC pattern; and repeating the performing the first correction step and the copying step for each of the groups. After the correction process, the method further includes storing the corrected IC design layout in a tangible computer-readable medium for use by a further IC process stage.

In another exemplary aspect, the present disclosure is directed to an integrated circuit (IC) manufacturing method. The method includes receiving a design layout of an integrated circuit (IC), wherein the design layout includes a plurality of IC regions, and each of the IC regions includes an identical initial IC design pattern. The method further includes performing a location effect analysis to the IC design layout thereby dividing the IC regions into a plurality of groups, wherein each group includes at least one of the IC regions and all IC regions in each group are to have substantially same location effect. The method further includes performing a correction process for each of the groups. The correction process includes performing a first correction to a first IC region in the respective group using a correction model that includes location effect, thereby modifying the initial IC design pattern to result in a first corrected IC design pattern in the first IC region; and copying the first corrected IC design pattern to other IC regions in the respective group, thereby replacing the initial IC design pattern in the other IC regions in the respective group with the first corrected IC design pattern. After all of the groups have undergone the correction process, the method further includes taping-out the IC design layout to be accessible by at least one of: a mask making tool and a lithography tool.

In another exemplary aspect, the present disclosure is directed to an integrated circuit (IC) manufacturing method. The method includes receiving an IC design layout having a plurality of non-overlapping IC regions, each of the IC regions including an identical initial IC pattern. The method further includes identifying a plurality of primary IC regions and a plurality of secondary IC regions based on a location effect analysis to the IC design layout, wherein each of the secondary IC regions is associated with one of the primary IC regions for having substantially same location effect there between. The method further includes performing a correction process to the IC design layout using a correction model that includes proximity effect and location effect thereby resulting in a corrected IC design layout. The correction process includes applying a first correction to each one of the primary IC regions and resulting in a corrected IC pattern therein; and replacing the initial IC pattern of each one of the secondary IC regions with the corrected IC pattern in one of the primary IC regions that is associated with the respective one of the secondary IC regions. The method further includes taping-out the corrected IC design layout to be accessible by at least one of: a mask making tool and an e-beam lithography tool.

The foregoing outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
receiving an integrated circuit (IC) design layout, wherein the IC design layout includes multiple IC regions that are separate from each other, and each of the IC regions includes an initial IC pattern that is substantially identical among the multiple IC regions;
identifying a group of IC regions from the multiple IC regions, wherein all IC regions in the group have a substantially same location effect, wherein the substantially same location effect is introduced by global locations of the IC regions on the IC design layout;
after the identifying, performing a correction process to a first IC region in the group, thereby modifying the initial IC pattern in the first IC region to result in a first corrected IC pattern in the first IC region, wherein the correction process includes using a computer program to correct location effect of the first IC region; and
replacing the initial IC pattern in a second IC region in the group with the first corrected IC pattern.

2. The method of claim 1, wherein the first IC region includes other IC patterns, and wherein the performing of the correction process includes modifying the other IC patterns in the first IC region.

3. The method of claim 1, further comprising, replacing the initial IC pattern in all other IC regions in the group with the first corrected IC pattern.

4. The method of claim 1, wherein the identifying of the group includes:
comparing location effect of the first and second IC regions at corresponding points of interest of the first and second IC regions; and
treating the first and second IC regions as having a substantially same location effect if location effect difference at each of the corresponding points of interest is within a respective threshold.

5. The method of claim 4, wherein the points of interest include pixels, target points, segments, polygons, patterns, or areas.

6. The method of claim 1, further comprising providing a coordinate table that includes a set of coordinates associated with each of the IC regions.

7. The method of claim 6, wherein the performing of the correction process to the first IC region includes using the computer program to:
correct the initial IC pattern of the first IC region according to the location effect and a respective set of coordinates, resulting in a modified IC pattern;
simulate the modified IC pattern using a correction model to generate a contour of the modified IC pattern;
determine if the contour of the modified IC pattern is acceptable; and
correct the modified IC pattern according to the location effect and the respective set of coordinates if the contour is unacceptable.

8. The method of claim 1, wherein the correction process further includes using another computer program to correct proximity effect.

9. The method of claim 1, further comprising:
repeating the identifying, the performing, and the replacing for all the IC regions in the IC design layout.

10. A method comprising:
receiving an integrated circuit (IC) design layout, wherein the IC design layout includes multiple IC regions that are separate from each other, each of the IC regions defines an IC die that includes a substantially same first IC pattern;
using a computer program to identify a group of IC regions from the multiple IC regions, wherein all IC regions in the group have a substantially same location effect, wherein the location effect is associated with a global location of the first IC pattern in the IC design layout;
performing a correction process to a first IC region of the group, thereby modifying the first IC pattern in the first IC region to result in a first corrected IC pattern, wherein the correction process includes using another computer program; and
replacing the first IC pattern in other IC regions of the group with the first corrected IC pattern.

11. The method of claim 10, wherein using the computer program to identify the group of IC regions from the IC regions includes:
comparing location effect of two of the IC regions to derive a difference in location effect; and
if the difference is within a threshold, placing the two of the IC regions into the group.

12. The method of claim 11, wherein the comparing includes:
calculating differences in location effect at points of interest of the two of the IC regions.

13. The method of claim 12, wherein the points of interest include pixels, target points, segments, polygons, patterns, areas, or combinations thereof.

14. The method of claim 12, wherein all of the points of interest are assigned a same threshold.

15. The method of claim 11, wherein a portion of the points of interest are assigned a different threshold than a second portion of the points of interest.

16. A method comprising:
receiving an integrated circuit (IC) design layout, wherein the IC design layout includes multiple IC regions that are separate from each other, each of the IC regions defines at least an IC die, and each of the IC regions includes a substantially same first IC pattern;
dividing the IC regions into groups based on a location effect analysis to the IC design layout such that IC regions in a same group have a substantially same location effect, and wherein the location effect is introduced by global locations of the IC regions in the IC design layout;
performing a correction process to an IC region of one of the groups, wherein the correction process includes correcting location effect, and wherein the correction process modifies the first IC pattern in the IC region to be a corrected first IC pattern; and
replacing the first IC pattern in other IC regions of the one of the groups with the corrected first IC pattern, wherein at least one of the location effect analysis and the correction process is performed by a computer program.

17. The method of claim 16, further comprising:
repeating the performing of the correction process and the replacing of the first IC pattern to other ones of the groups.

18. The method of claim 16, wherein the location effect analysis includes:

comparing location effects of two IC regions at multiple points of interest; and treating the two IC regions as having a substantially same location effect if a difference of the location effects is within a threshold.

19. The method of claim 18, wherein the points of interest include pixels, target points, segments, polygons, patterns, or areas.

20. The method of claim 16, wherein the correction process further includes correcting proximity effect.

* * * * *